(12) United States Patent
Michallon (10) Patent No.: US 10,086,618 B2
(45) Date of Patent: Oct. 2, 2018

(54) DEVICE FOR LEVEL MEASUREMENT IN A RESERVOIR (71) Applicant: Dover Europe Sàrl, Vernier (CH)

(72) Inventor: Jannick Michallon, Saint Peray (FR)

(73) Assignee: DOVER EUROPE SARL, Vernier (CH)

( * ) Notice: Subject to any disclaimer, the term of this patent is extended or adjusted under 35 U.S.C. 154(b) by 0 days.

(21) Appl. No.: 15/342,487

(22) Filed: Nov. 3, 2016

(65) Prior Publication Data

US 2017/0120616 A1 May 4, 2017

(30) Foreign Application Priority Data

Nov. 4, 2015 (FR) ...................................... 15 60579

(51) Int. Cl.
B41J 2/175 (2006.01)
(52) U.S. Cl.
CPC ........... *B41J 2/175* (2013.01); *B41J 2/17566* (2013.01); *B41J 2002/17579* (2013.01)
(58) Field of Classification Search
CPC ................... B41J 2/175; B41J 2/17566; B41J 2002/17579
See application file for complete search history.

(56) References Cited

U.S. PATENT DOCUMENTS

| | | | |
|---|---|---|---|
| 4,027,172 A * | 5/1977 | Hamelink | ............. G01F 23/241 307/118 |
| 4,196,625 A | 4/1980 | Kern | |
| 4,483,463 A | 11/1984 | Buschmann | |
| 4,626,874 A | 12/1986 | Toshiharu Murai et al. | |
| 4,700,754 A | 10/1987 | Kringe | |
| 5,546,005 A | 8/1996 | Rauchwerger | |

(Continued)

FOREIGN PATENT DOCUMENTS

DE 102009030674 A1 12/2010
DE 102010038535 A1 2/2012

(Continued)

OTHER PUBLICATIONS

Extended European Search Report issued in Patent Application No. EP 16 19 7218 dated Mar. 21, 2017.

(Continued)

*Primary Examiner* — Yaovi M Ameh
(74) *Attorney, Agent, or Firm* — Pearne & Gordon LLP (57) ABSTRACT

A device for measuring the level in a reservoir of an inkjet printer, comprising: an electrode, which has a first end and an second end, and which is covered from the first end up to an intermediate level between the first end and the second end, with an electrically insulating coating, where the electrode has capacitive behavior for a level of liquid between the first end and the intermediate level, and resistive behavior beyond this, circuit for measuring a signal which is characteristic of capacitive behavior of the device, for a liquid level between the first end and the intermediate level, and for identifying resistive behavior of the device for a level of the liquid above the intermediate level, circuit for estimating or calculating, from the characteristic signal, a height of the liquid contained in the reservoir, for a liquid level between the first end and the intermediate level.

21 Claims, 7 Drawing Sheets

(56) References Cited

U.S. PATENT DOCUMENTS

| | | | |
|---|---|---|---|
| 2001/0000851 A1* | 5/2001 | Morimoto | G01F 23/266 73/304 C |
| 2007/0068249 A1 | 3/2007 | Eguchi et al. | |
| 2010/0231662 A1* | 9/2010 | Ara | B41J 2/17509 347/85 |
| 2011/0174067 A1* | 7/2011 | Boiarski | A61F 5/4404 73/149 |
| 2012/0111870 A1 | 5/2012 | Hodgson et al. | |
| 2013/0118254 A1 | 5/2013 | Urban et al. | |

FOREIGN PATENT DOCUMENTS

| | | |
|---|---|---|
| EP | 0 028 399 A2 | 5/1981 |
| EP | 0 208 377 A1 | 1/1987 |
| EP | 0 784 784 | 7/1997 |
| EP | 1 125 748 A1 | 8/2001 |
| EP | 1 203 934 A2 | 5/2002 |
| EP | 1 493 586 A1 | 1/2005 |
| FR | 1 436 080 A | 4/1966 |
| FR | 2 514 498 A1 | 4/1983 |
| WO | 96/11385 A1 | 4/1966 |
| WO | 98/02718 A1 | 1/1998 |
| WO | 2008/062146 A1 | 5/2008 |
| WO | 2011-076810 A1 | 6/2011 |

OTHER PUBLICATIONS

Search Report issued in French Patent Application No. FR 15 60579 dated Sep. 6, 2016.
Machine Translation of European Patent Publication No. EP 0028399 dated May 13, 1981.
Written Opinion and Search Report issue din Application No. EP 15 190 721 dated Jan. 29, 2016.
Gabriel Nicolae Popa et al., "A Study About a Resistive Stepped Transducer Used for Water Level Measurement" Annals of the Faculty of Engineering Hundedoara—Journal of Engineering, vol. 7, No. 3, 2009.
Search Report issued in French Patent Application No. FR 14 60138 dated Jun. 19, 2015.
European Office action for Application No. 16197218.7, dated Mar. 21, 2018.

* cited by examiner

DEVICE FOR LEVEL MEASUREMENT IN A RESERVOIR

TECHNICAL FIELD AND PRIOR ART

The invention relates to the field of continuous inkjet (CIJ) printers.

It also relates to a device and a method for measuring a level of liquid which is conductive or even of very low conductivity, in particular ink or solvent in a reservoir of such a printer.

Continuous inkjet (CIJ) printers are well known in the field of coding and marking of industrial and diverse products, for example, for marking barcodes, expiry dates on food products or part numbers or distance markers on cables or pipes directly on the production line and at high speed. This type of printer is also found in some fields in decoration, where the graphic printing possibilities of the technology are exploited.

Figure 1:
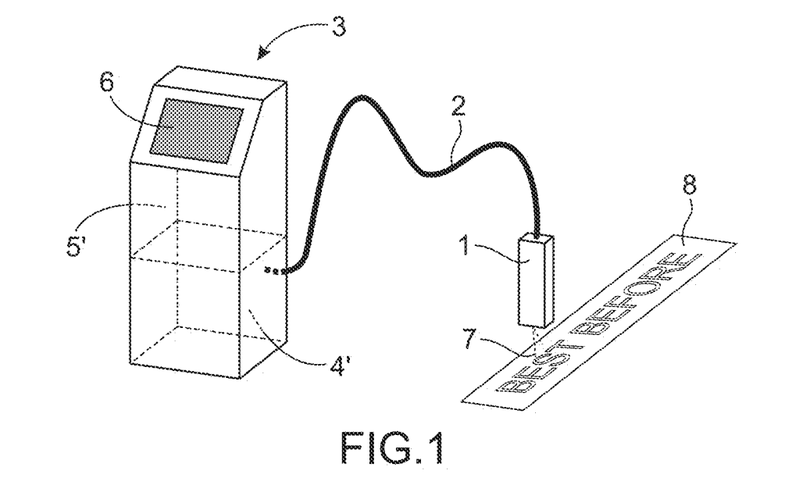
FIG. 1 shows a known printer structure.

These printers have several typical sub-assemblies as shown in FIG. 1.

Firstly a printing head 1, generally offset relative to the printer body 3, is connected to the latter by a flexible umbilical cable 2 which gathers together the electrical and hydraulic connections required for the operation of the head, giving it a flexibility which facilitates incorporation on the production line.

The printer body 3 (also called the console or cabinet) usually contains three sub-assemblies:
- an ink circuit in the lower part of the console (zone 4'), which on the one hand allows ink to be supplied to the head at a stable pressure and with a suitable quality, and on the other hand to take control of the ink from the jets that is not used for printing,
- a controller located at the top of the console (zone 5'), capable of managing the sequencing of actions and of performing the processing allowing the various functions of the ink circuit and of the head to be activated,
- an interface 6 which gives the operator the means of using the printer and of receiving information about its operation.

In other words, the cabinet comprises 2 sub-assemblies: at the top part the electronics, the electrical supply and the operator interface and at the lower part an ink circuit supplying ink of nominal quality and under pressure to the head, and the negative pressure for recovery of the ink not used by the head.

Figure 2:
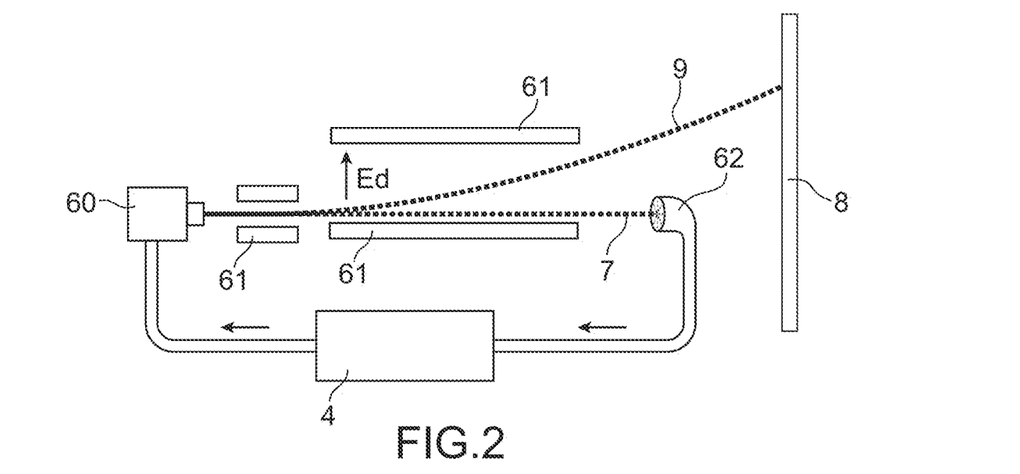
FIG. 2 shows a known structure of a printer head of a CIJ type printer.

The FIG. 2 schematically shows a printer head 1 of a CIJ printer. It comprises a drop generator 60 supplied with electrically conductive ink, pressurised by the ink circuit.

This generator is capable of emitting at least one continuous jet through an orifice of small dimensions known as a nozzle. The jet is transformed into a regular succession of droplets of identical size due to the action of a periodic stimulation system (not shown) located upstream of the outlet from the nozzle. When the droplets 7 are not intended for printing they are directed towards a drain (or gutter) 62 which recovers them in order to recycle the unused ink and to send it back into the ink circuit.

Devices 61 placed along the jet (charge and deflection electrodes) are used, when commanded, to electrically charge the droplets and to deflect them in an electrical field Ed. These are then deviated from their natural ejection trajectory from the droplet generator. The droplets 9 intended for printing escape from the drain (or gutter) and are deposited on the medium to be printed 8.

This description may be applied to so-called binary or multi-deflection continuous jet continuous jet printers (CIJ). Binary CIJ printers are equipped with a head whose droplet generator possesses a multitude of jets. Each droplet from a jet can only be oriented in two trajectories: printing or recovery. In multi-deflection continuous jet printers, each droplet from a single jet (or from several jets spaced apart) may be deflected along various trajectories which correspond to the differing charge commands between one droplet to the next, thus carrying out a sweep of the zone to be printed along a direction which is the deflection direction, the other sweep direction of the zone to be printed is covered by relative displacement of the printing head and of the medium to be printed 8. Generally, the elements are arranged in such a way that these two directions are substantially perpendicular.

An ink circuit of a continuous inkjet printer is used on the one hand to supply ink under a regulated pressure and, if necessary, solvent to the droplet generator of the head 1 and on the other hand to create a depression in order to recover fluids not used for printing and which then return from the head.

It is also used to manage consumables (distribution of ink and solvent from a reserve) and to check and maintain the quality of the ink (viscosity/concentration).

Finally, other functions are associated with the ease of use for the user and the automatic undertaking of certain maintenance operations in order to guarantee constant operation, irrespective of the conditions of use. Amongst these functions are rinsing of the head with solvent (droplet generator, nozzle, drain (or gutter)), assistance with preventative maintenance, for example replacement of components with a limited operating life, in particular filters and/or pumps.

These various functions have very different end outcomes and technical requirements. They are activated and sequenced by the printer controller whose complexity increases with the number and sophistication of the functions.

In general, the ink circuit for known inkjet printers which are capable of spraying inks is a costly element, due to the numerous hydraulic components to be operated.

The problem therefore arises of carrying out all or part of the functions of an ink circuit in a CIJ-type printer, at lower cost and with a reduced number of components, whilst ensuring a minimum level of reliability or, in all events, reliability expected by users, in particular associated with the homogeneity of inks throughout the period of consumption. It is therefore sought to use the simplest components possible, in particular for functions such as measurement of levels in reservoirs, the checking and maintenance of the ink quality. The last may be defined in terms of viscosity and/or of ink concentration.

As regards level sensors, sensors are known which measure one or more levels, but in a discreet manner. This type of sensor can operate on the basis of a capacitance-based, or optical measurement, or using floats which are triggered at a given threshold. This type of device only allows one or several discreet levels to be indicated: full, empty, low, intermediate.

For example, a known sensor uses level rods which indicate whether or not there is current between the rods, with this current being linked to the level of ink. Since it is not sought to measure the value of this current, they are independent of the conductivity.

Document EP 0784784 describes such a discreet sensor.

Document WO 2011/076810 describes a continuous sensor which is, however, complex and costly.

The problem therefore arises of finding a new sensor, of a continuous and linear type, and which is simpler than known sensors.

Such a sensor is preferably easy to implement and of low cost.

DESCRIPTION OF THE INVENTION

The invention first of all relates to a device for measuring the level in a reservoir of an inkjet printer, comprising:
an electrode, which has a first end and a second end, covered, from the first end up to an intermediate level between the first end and the second end, with an electrically insulating coating,
means, for example means programmed or specially programmed, for measuring a signal ($S_m$) which is characteristic of the capacitance or of the capacitive behaviour of the electrode (and its coating) or of the device when a liquid is contained in the reservoir, with a level between said first end and the intermediate level and for identifying or detecting a resistive behaviour or a change from the capacitive behaviour to the resistive behaviour of the electrode or of the device, for a level of the liquid above the intermediate level,
means, for example means programmed or specially programmed, for estimating or calculating, from said characteristic signal, a height (h) of the liquid when such a liquid is contained in said reservoir, with a liquid level between said first end and the intermediate level.

The electrode, or the single electrode, its coating and the liquid exhibit capacitive behaviour, or form a capacitance, for a level of liquid between said first end and the intermediate level: the coating forms the dielectric between the metallic part of the electrode and the liquid. The electrode exhibits resistive behaviour, or forms a resistance, beyond this intermediate level, for a level of liquid above the intermediate level, with a voltage at the terminals of the electrode being proportional to the current flowing in the electrode and in the liquid.

Such a device may comprise means, for example means programmed or specially programmed, for applying at least one current pulse to said electrode, with a characteristic signal being emitted by the electrode in response to said current pulse.

Means, for example means programmed or specially programmed, may be envisaged for measuring the time taken for said characteristic signal to reach a predetermined value ($S_p$), in response to said current pulse.

According to one embodiment, such a device may include means, for example means programmed or specially programmed, for applying at least one current pulse to said electrode, for example by generating and applying input signals, in particular voltage pulses or voltage steps, to means forming an input resistance arranged in series with said electrode; a characteristic signal is emitted by the electrode in response to each current pulse, for example following at least one of the said input signals.

Means, for example means programmed or specially programmed, may be envisaged or, implemented for measuring the time taken for said characteristic signal to reach a predetermined value ($S_p$), in response to said current pulse or other input signal.

Said means of measurement may comprise a comparator to compare an amplitude of said characteristic signal with the predetermined threshold value.

Furthermore means, for example means programmed or specially programmed, may be envisaged or implemented for detecting a time interval that has elapsed between a synchronous instant of an input signal applied to said resistance, for example an instant of a voltage pulse rising edge, and an instant at which said predetermined value is reached. These means may emit a stop or zero-reset signal for the charge and/or the current pulse or for the input signal.

The characteristic signal ($S_m$) of the capacitive behaviour of the device may be the change over time of the charge of the capacitance, formed by the part of the electrode located between the first end and the intermediate level, the insulating coating and the liquid.

A device according to the invention may be applied to a reservoir which has at least one metallic portion or wall, at least one electrical contact which may be placed against, or inserted in, said metallic portion or wall.

The invention also relates to an ink and/or solvent reservoir for an inkjet printer, for example of the continuous (CIJ) type, which comprises a level measurement device according to the invention.

The invention also relates to an inkjet printer, for example of the continuous (CIJ) type, comprising:
an ink circuit and a solvent circuit, each comprising a reservoir and at least one of them comprising a reservoir according to the invention,
a printing head,
means of hydraulic connection, or a hydraulic circuit, to bring ink to be printed from the ink circuit to the printing head and to send ink to be recovered from the printing head to the ink circuit,
means of electrical connection to provide an electrical supply to said printing head.

The invention also relates to a method for measuring the level of ink and/or solvent in a reservoir of an inkjet printer, in particular of the continuous (CIJ) type, which implements a device according to the invention.

The invention also relates to a method for measuring the level of ink and/or solvent in a reservoir of an inkjet printer, for example continuous (CIJ) type, which comprises:
sending at least one current pulse to an electrode, which has a first end and an second end and which is covered from the first end up to an intermediate level between the first end and the second end, with an electrically insulating coating, where the electrode and its coating exhibit capacitive behaviour, or form a capacitance, for a level of liquid between said first end and the intermediate level, and where the electrode exhibits resistive behaviour or which exhibits a resistive behaviour or forms a resistance, beyond this, for a liquid level greater than the intermediate level,
the detection or measurement, in response to at least one current pulse sent to the electrode, of a signal ($S_m$) characteristic of the capacitance or of the capacitive behaviour of the device (or of the electrode and its coating), for a liquid level between said first end and the intermediate level and the detection or identification of a change from capacitive behaviour to resistive behaviour of the device (or of the electrode) for a liquid level greater than the intermediate level,
the estimation or calculation, from said characteristic signal, of a height (h) of the liquid contained in said reservoir, for a liquid level between said first end and the intermediate level.

According to one embodiment:
a resistance, or means forming a resistance is/are arranged in series with the electrode,
input signals are generated and applied to said resistance or to said means, the time interval for said characteristic signal to reach the predetermined threshold value ($S_p$), in response to an input signal applied to said electrode, is measured.

The characteristic signal may be compared with a predetermined value or threshold. The time interval elapsed between a synchronous instant of a current pulse applied to said electrode, for example a rising edge of a voltage pulse applied to the resistance arranged in series with the electrode, and an instant at which said predetermined value (or threshold) is reached, can be counted or measured or estimated. A stop or zero-reset signal for the applied current pulse or input signal may then be emitted. The height of the liquid can be estimated or calculated from this time interval that has elapsed.

The signal ($S_m$) characteristic of the capacitive behaviour of the device may be the change over time of the charge of the capacitance, formed by the part of the electrode located between the first end and the intermediate level, the insulating coating and the liquid.

Such a method may be implemented through coded data or instructions in the form of a computer programme.

A device or a method according to the invention can be used to provide a continuous and linear measurement of the liquid level between said first end and the intermediate level. It allows a level equal to the intermediate level to be identified when resistive behaviour occurs.

It can be used in an inkjet printer, in particular a continuous inkjet (CIJ) printer.

DETAILED ACCOUNT OF AN EMBODIMENT

Figure 3:
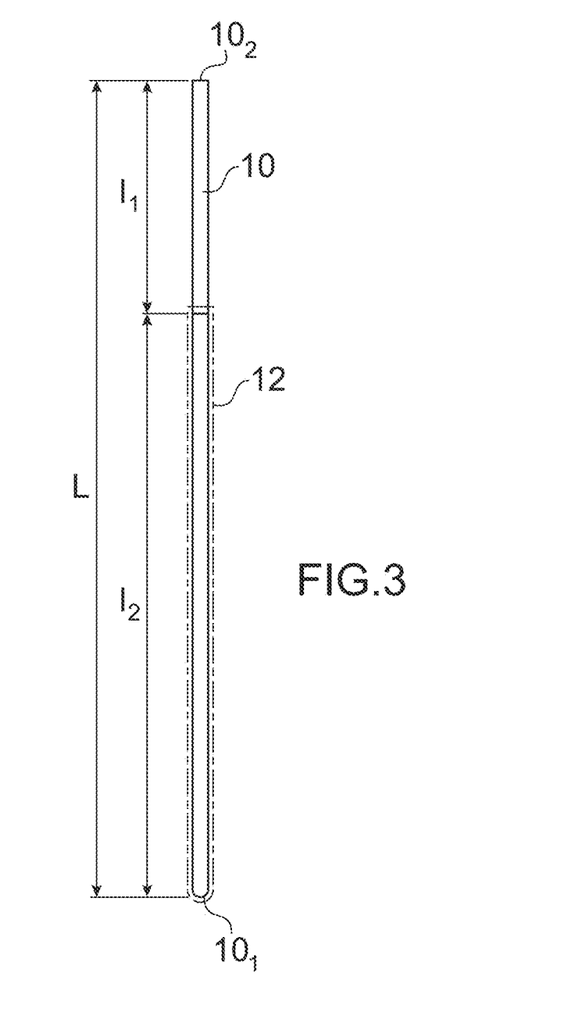
FIG. 3 shows an embodiment of an electrode that can be used within the scope of the present invention.

An example of a measurement electrode 10 for a measuring device according to the invention is illustrated in FIG. 3.

The electrode shown here is of a substantially elongated shape and extends between a first end $10_1$ and a second end $10_2$. It has a length L. The conductive material of the electrode, for example stainless steel, is covered, over a part of the length of the electrode from its first end $10_1$, and up to an intermediate level located at a distance $I_2$ ($\neq L$) from the first end, by a coating 12 made of a dielectric or electrically insulating material, for example a PTFE coating. The rest of the electrode, of length $I_1$, located between this intermediate level and the second end $10_2$ is not covered with this coating.

According to one embodiment, the length L of the single electrode is, for example, between 50 mm and 200 mm, it is, again for example, about 150 mm; the length over which the coating 12 extends is for example between 30 mm and 170 mm, it is, again for example, about 110 mm. The length $I_1$ that is free of coating 12 is for example between 20 mm and 30 mm. These examples relate to specific embodiments but do not pre-exclude different design dimensions for the electrode and/or ink circuit, in particular the height of the reservoirs.

The coating 12 can have a thickness between a few tens of micrometers and a few hundred micrometers, for example between 10 μm or 20 μm and 100 μm or 200 μm or 500 μm, and it is for example 100 μm.

If it is of circular cross-section, the electrode 10 may have a diameter of a few millimeters, between 1 mm and 5 mm, for example 3 mm. It can however have other forms, for example that of a ribbon (with, for example a rectangular or square cross section).

This single electrode can be used to identify a liquid level in the reservoir. With it are associated measurement means 30-40 which will be described below.

Figure 4A:
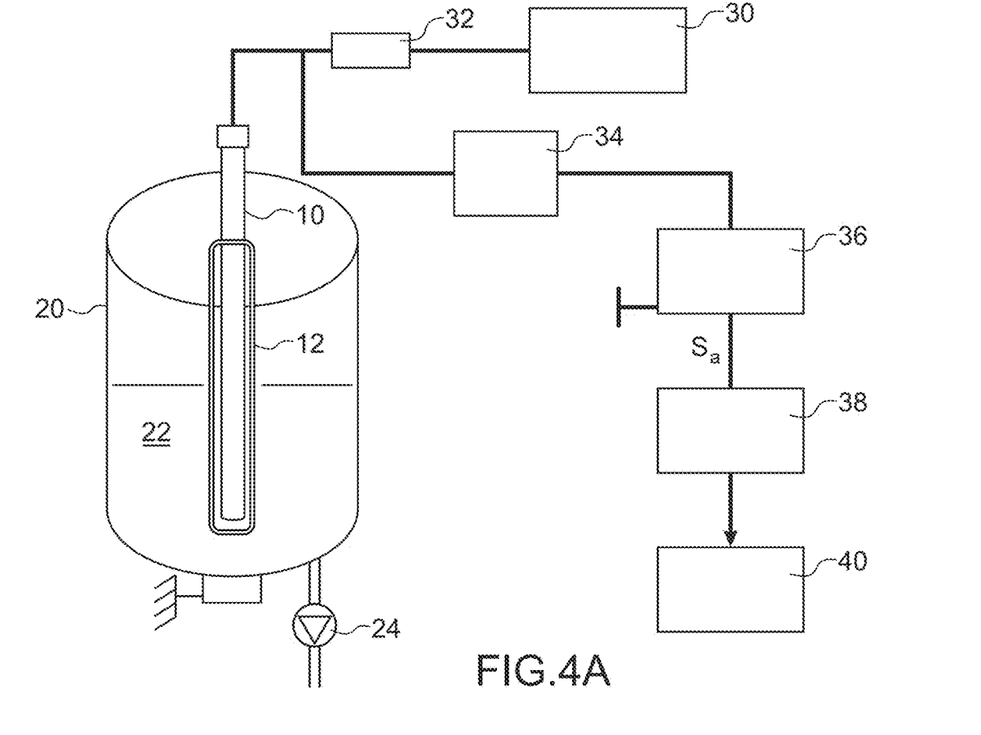
FIG. 4A shows a diagram of a sensor according to the present invention, which comprises an electrode and various measurement means.

FIG. 4A shows such a single electrode arranged in a reservoir 20 which contains a conductive liquid 22, for example a solvent such as MEK (methylethylketone) or an ink, for example a pigment or dye ink. The system can operate according to the present invention, even with a liquid of very low conductivity, of a few μS, for example between 1 and 10 μS (for example the solvent MEK has a conductivity of less than 5 μS). The electrode is immersed in the reservoir such that the free surface of the liquid is at a level located between the first end $10_1$ and the intermediate level or the limit of the insulating coating 12 along the electrode, at a distance $I_2$ from the first end.

The reservoir 20 is conductive, it is for example metallic, or comprises a conductive, for example a metallic, wall or portion, which may be in contact with the liquid when the latter is present in the reservoir; such a conductive wall or portion is preferably located at the base of the reservoir in order to be in contact with the liquid even when present in small quantities. An earthing pin or contact 23 is fixed against or inserted in this conductive or metallic portion. This pin or contact 23 may be connected to an earth. Reference 24 relates to means for pumping a liquid contained in the reservoir.

The measurement signal $S_m$ supplied by an electrode according to the invention may be measured with respect to an earth reference, for example with respect to said conductive wall or portion and/or with respect to said earthing pin or contact.

A circuit or a generator 30 applies input signals, preferably consecutive or repetitive, for example periodic signals to a resistance 32 (or more generally to any means which form a resistance or which exhibit resistive behaviour, for example made using any electronic component) arranged at the input to the electrode, in series with it. According to one embodiment this involves voltage pulses, which may have a stepped form over time (at the input to the resistance 32), with a rising edge, a maximum level which is substantially constant, for example of amplitude 3.3 V, for a predetermined time, then a falling edge. These input signals may be generated at regular time intervals, for example every 100 ms. The resistance 32, for example of about 500 kΩ is arranged in series, between the outlet from this generator and the electrode 10.

Current pulses are therefore applied to the electrode, each pulse generating a charge in the insulating coating 12 of the electrode when it exhibits capacitive behaviour.

Furthermore, each input signal or a portion of each input signal, for example a rising edge of this signal, triggers a counting means or counter 38 (or a clock or a timer or means forming a clock or a timer). The event which triggers the counting may also be any instant which has a time difference defined in relation to, or synchronised with, an input signal, for example with its rising edge, with subsequent processing of the measurement signal then taking this difference into consideration.

In response to the current pulses which are applied to it, the electrode provides a signal $S_m$, called the measurement signal, preferably a voltage. This signal is processed by a circuit or a set of means 34-38.

Since the free surface of the liquid is located at a level of the electrode that is covered with dielectric material, the electrode, the insulation 12 and the liquid exhibit capacitive behaviour, with the height of the liquid causing the capacitance to vary, and where the relationship between these 2 variables is substantially linear. In effect, the value of the capacitance is approximately in accordance with the relationship:

$$C \approx 2\pi\epsilon_0 \frac{\epsilon_{r1} h_1}{\ln((d + 2e)/d)}$$

where $h_1$ is the height of the liquid along the electrode, d is the diameter of the metallic core of the electrode (in the case of a circular cross-section), e is the thickness of the insulation 12 and $\epsilon_0$, $\epsilon_r$ the relative permittivity of the media.

The measurement signal $S_m$ supplied by the electrode will therefore be characteristic of this capacitance or of this capacitive behaviour. According to one example, it corresponds, or is proportional to, the charge of the capacitance formed by the part of the electrode provided with a coating and by the liquid. This signal is crescent-shaped (or is increasing according to time), and tends to an asymptotic value (at level $Q_{max}$), as shown schematically in FIG. 4B.

A circuit, or means 36, for example an analogue comparator, are used to supply a signal $S_a$, called the stop signal, which may take the form of a stepped pulse, when the measurement signal $S_m$ reaches a predetermined threshold amplitude or value $S_p$. This latter may be, or may correspond to, a determined fraction or proportion of the maximum value or amplitude of the input signal provided by the means 30, for example 60% to 66% of this maximum value or amplitude, which corresponds very closely to the time constant of the RC circuit. Thus the time interval τ taken for the charge of said capacitance to reach a predetermined value is measured, where this time interval τ is equal to about RC, where R is the input resistance 32, and C the capacitance, itself proportional to the height of liquid in the reservoir.

According to one embodiment, the measurement signal is a voltage, the maximum value of an input pulse provided by the means 30 is 3.3V and the predetermined threshold $S_p$ is 2 V. The stop signal $S_a$ is sent to the counter 38, allowing the latter to be stopped.

A circuit or means 40 receive the count information from means 38 and can estimate the time interval $t_{sp}$ that has elapsed since the event which triggered the count by means 38 up to when the measurement signal $S_m$ reaches the threshold value or amplitude $S_p$. They then calculate or estimate the height h of the liquid in the reservoir, with a good degree of linearity having been experimentally observed between this height h and the time interval $t_{sp}$, corresponding to the formula C given below.

Means 34 which form a low-pass filter may be envisaged for filtering the measurement signal $S_m$ coming from the electrode, for example because of the noise which may come from the measurement circuit.

Figure 4B:
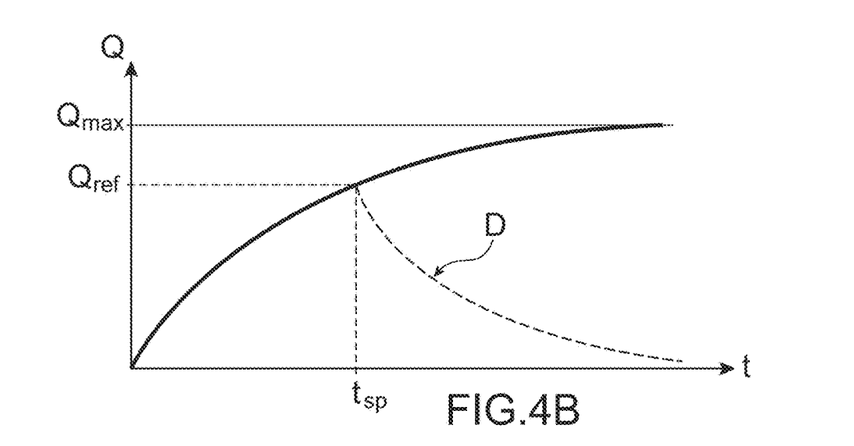
FIG. 4B shows a possible measurement signal for operation of the sensor in capacitive mode.

The signal supplied by the comparator 36, when the measurement signal $S_m$ reaches the predetermined value $S_p$ (or threshold), also allows the pulse supplied by the means 30 to be reset to zero, and the discharge of the capacitance initiated, with the aim of carrying out a new measurement. The means 30 may then send a new pulse once the capacitance has been effectively discharged (for example at the end of a time interval equal to at least 5 times the time constant of the RC circuit), in order to begin another measurement. Each measurement corresponds to the sending of a single pulse. FIG. 4B shows the discharge phase D as a decreasing portion of the curve, after the threshold $S_p$ has been passed (this corresponds to a given charge $Q_{ref}$, identified in the ordinate of the graph FIG. 4B).

Figure 5A:
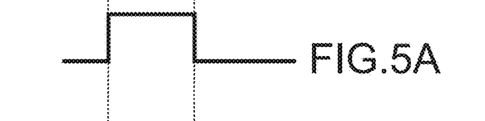
FIGS. 5A-5C show various signals during the operation of a sensor according to the present invention in capacitive mode.
Figure 5B:
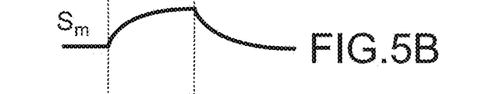
Figure 5C:
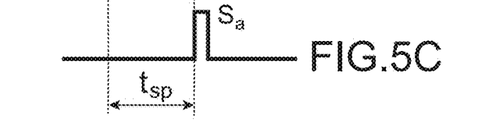

FIG. 5A-5C shows on the one hand the shape of a pulse sent by the means 30 (FIG. 5A) and on the other hand the change over time of the measurement signal $S_m$, obtained in response (FIG. 5B). The instant $t_{sp}$ at which this measurement signal reaches the predetermined value is that at which a pulse $S_a$ (FIG. 5C) is sent by the comparator 36 on the one hand to stop the counter, and thus to allow the duration of the increase in charge up to the predetermined level to be estimated, and on the other hand to reset the means 30 to zero and initiate the discharge of the capacitance.

The pulse in FIG. 5A, for example its rising edge, is used to start the time counting by the counter 38. The latter is stopped when the measurement signal level reaches the predetermined level (FIG. 5B). From the instant $t_{sp}$ at which this level is reached, the input pulse is gradually returned to 0.

Figure 6:
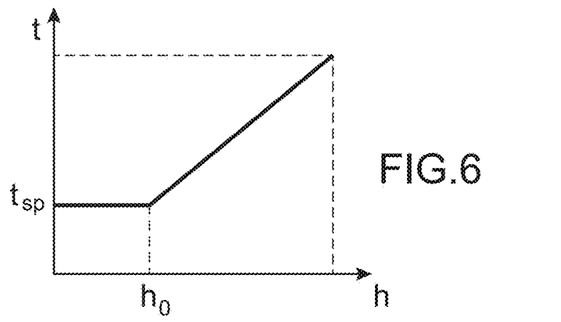
FIG. 6 shows the relationship between the characteristic time measured and the height of liquid, during operation of the sensor in capacitive mode, FIG. 7 schematically shows a reservoir partially filled with liquid, equipped with a measurement electrode according to the invention.

As shown in FIG. 6 the change in the instant $t_{sp}$ at which the measurement signal $S_m$ reaches the threshold value $S_p$ is substantially proportional to the level h to which the reservoir is filled, for h values between the level $h_0$ at which the free surface of the liquid is in contact with the lower end $10_1$ of the electrode 10, and the level $h_2$ at which the free surface of the liquid reaches the maximum level of coverage of the electrode by the dielectric 12. Between these two levels the sensor operates in a capacitive manner. For a liquid level beneath the first end $10_1$ of the electrode the capacitance remains constant, and therefore $t_{sp}$ itself also remains constant.

Consequently detection of the instant at which the threshold value $S_p$ is reached by the measurement signal allows the level to which the reservoir is filled to be estimated or calculated.

Figure 7:
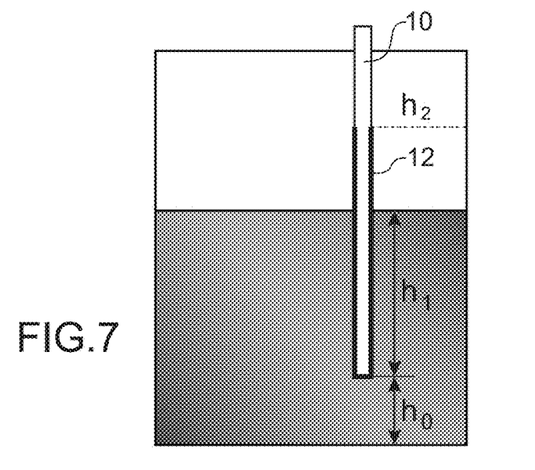

As described above, when the surface of the liquid reaches a level $h_1$ arranged between the first end $10_1$ and the limit of the insulating coating 12, the system behaves in a capacitive manner. This situation is shown in FIG. 7. When the level is below the lower end $10_1$ of the electrode, the assembly formed by the latter, its dielectric coating and air behaves once more in a capacitive manner, and even if the reservoir is empty, a capacitance may be measured (but the capacitance in air is much lower than the capacitance in the presence of liquid and it can be neglected). The capacitance measured when empty is a result not only of the capacitance of the sensor in air but also of all interfering capacitances of the system (wiring, electronics etc.) which remain constant irrespective of the level of the liquid. When the level of the liquid exceeds the limit of the insulating coating the system loses its capacitive behaviour and adopts a resistive behaviour. The resistance is then that present between the electrode and an earth point, across the liquid. The assembly is then earthed, the form of the measured signal $S_m$ changing in relation to the form that it had in capacitive mode. In the case of $S_m$ being a voltage, the latter is then constant (for a given input current), with an amplitude less than the predetermined threshold value. In effect, a dividing bridge is then formed with the resistance 32 and the resistance of the liquid located between the earthing point of the reservoir and the resistive portion of the electrode. A changeover to resistive mode may also be attributed to the system when the measurement signal has not reached the threshold value $S_p$, or when a predetermined time interval, for example 200 μs, counted by the counter 38, has passed without the threshold value $S_p$ being reached by $S_m$. The detection of the signal that has changed shape and/or the expiry of this predetermined time interval without the threshold value $S_p$ being passed by the measurement signal $S_m$ is then an indication of resistive behaviour, and therefore of the fact that the reservoir is filled to a level equal to or greater than the intermediate level, which may if appropriate be defined as maximum.

An alarm signal may then be triggered.

An alarm signal may then be triggered when the liquid level in the reservoir reaches a minimum level.

A calibration may be performed before each measurement.

For example, this calibration is carried out by measuring the measurement signal for two known levels in the reservoir; these levels may be:
  on the one hand, a $1^{st}$ level which is the low level of the electrode, and for which it is known from its construction that it corresponds to a liquid volume $V_{min}$ (for example 100 ml) and which provides a value of the time interval $T_0$ (which is also the time interval to reach the above mentioned limit $S_p$),
  on the other hand, a $2^{nd}$ level which corresponds to a liquid volume of, for example once more, 0.5 l and which gives a value of the time interval $T_{500}$ (which is also the time interval to reach the above mentioned limit $S_p$), The connection between the measured time interval and the volume contained in the reservoir is then:

$$V_{mes}=T_{mes}*(500-V_{mm})/(T_{500}-T_0)$$

Alternatively, a calibration may be carried out with a level of liquid such that the free surface of the latter is at the upper height, or at the limit, of the coating 12 along the electrode 10 whilst retaining capacitive behaviour. This height is in effect known from construction. In other words, the reservoir is filled up until the moment when the short-circuit (resistive behaviour zone) is reached.

Tests have been carried out with a system which exhibits the following characteristics:
  diameter of the electrode: 3 mm,
  length of the electrode: 150 mm,
  length of the covering of the electrode with the dielectric 12: 110 mm,
  dielectric 12 made of PTFE, of thickness 100 μm,
  input pulse of amplitude 3.3 V,
  filter 34 with cut-off frequency 25 kHz,
  comparison level of the comparator 36: 2 V.

Table I shows together all the experimental measurements made using this system, with the liquid being an MEK based ink: for each liquid level (first column), several measurements of $t_{sp}$ (obtained by counting using a periodic timer from the rising edge of pulses generated by the means 30) are made, and averaged; the second column of the table gives the mean value of the count obtained and the last column gives the average time interval tspmoy in μs.

TABLE I

| Ink level (mm) | Counter value Time interval $t_{spmoy}$ (mean) | Time interval $t_{spmoy}$ (mean) in μs |
|---|---|---|
| 10 | 4153 | 49.836 |
| 15 | 4976 | 59.712 |
| 20 | 5804 | 69.648 |
| 25 | 6440 | 77.28 |
| 30 | 7206 | 86.472 |
| 35 | 8147 | 97.764 |
| 40 | 9752 | 117.024 |
| 45 | 10863 | 130.356 |
| 50 | 12081 | 144.972 |
| 55 | 12792 | 153.504 |
| 60 | 13961 | 167.532 |
| 65 | 14980 | 179.76 |
| 70 | 16302 | 195.624 |
| 75 | 17780 | 213.36 |
| 80 | 19463 | 233.556 |
| 85 | 20270 | 243.24 |
| 90 | 20642 | 247.704 |
| 95 | 20900 | 250.8 |
| 100 | 21170 | 254.04 |

Figure 8A:
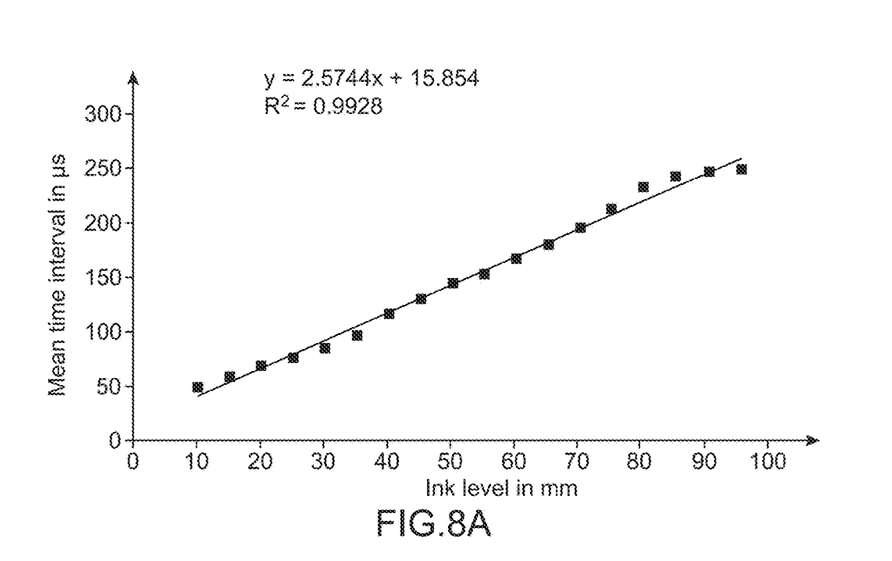
FIGS. 8A and 8B represent the results of tests carried out with a sensor according to the present invention.

The graph in FIG. 8A gathers together these results.

Table II shows, for the same system, measurements made using an MEK solvent: for each liquid level (first column), several measurements of $t_{sp}$ (obtained by counting using a periodic timer from the rising edge of pulses generated by the means 30) are made, and averaged; the second column of the table gives the mean value of the count obtained and the last column gives the average time interval $t_{spmoy}$ in μs.

TABLE II

| Solvent level (mm) | Counter value Time interval $t_{spmoy}$ (mean) | Time interval $t_{spmoy}$ (mean) in μs |
|---|---|---|
| 10 | 3780 | 45.36 |
| 15 | 3870 | 46.44 |
| 20 | 3960 | 47.52 |
| 25 | 4110 | 49.32 |
| 30 | 4160 | 49.92 |
| 35 | 4240 | 50.88 |
| 40 | 4340 | 52.08 |
| 45 | 4460 | 53.52 |
| 50 | 4580 | 54.96 |
| 55 | 4680 | 56.16 |
| 60 | 4760 | 57.12 |
| 65 | 4840 | 58.08 |
| 70 | 4980 | 59.76 |
| 75 | 5060 | 60.72 |
| 80 | 5130 | 61.56 |
| 85 | 5270 | 63.24 |
| 90 | 5380 | 64.56 |
| 95 | 5300 | 63.6 |
| 100 | 5440 | 65.28 |

Figure 8B:
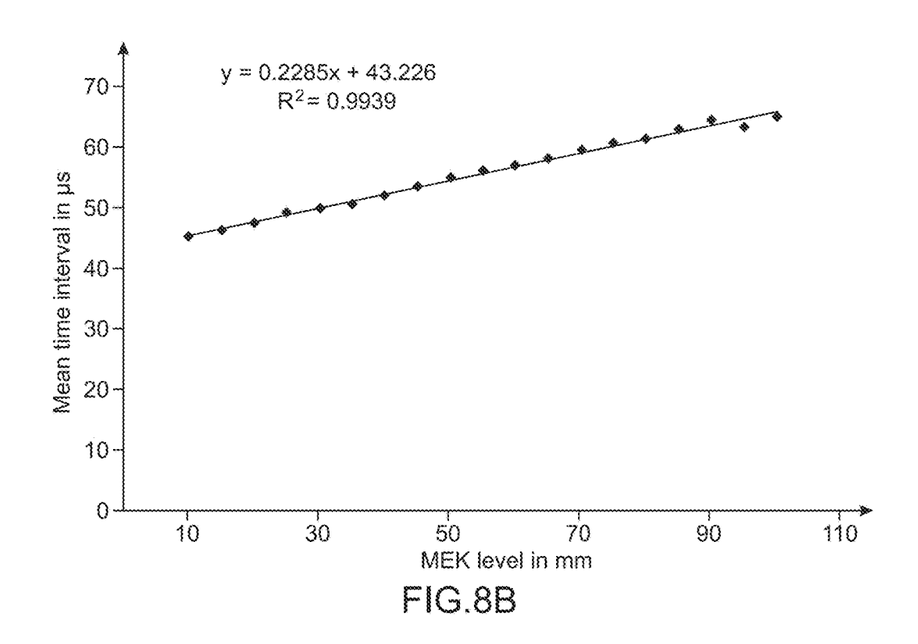

The graph in FIG. 8B gathers together these results.

The curves in FIGS. 8A and 8B give the mean time interval $t_{sp}$ (ordinate axis) as a function of the length of electrode covered by the liquid (abscissa axis). If this length is zero, an interference capacitance gives a minimum signal time interval (see the ordinate at the origin). Once the level reaches the bottom of the electrode, the capacitance increases from this interference capacitance value, as does the time interval $t_{sp}$.

A high degree of linearity is observed in both instances between the measured durations and the corresponding liquid level (if the last is above the lower end of the electrode).

Outside measurement phases, the electrode 10 with its measurement means 34-38 and/or the means 30, may be withdrawn and separated from the reservoir.

Figure 9:
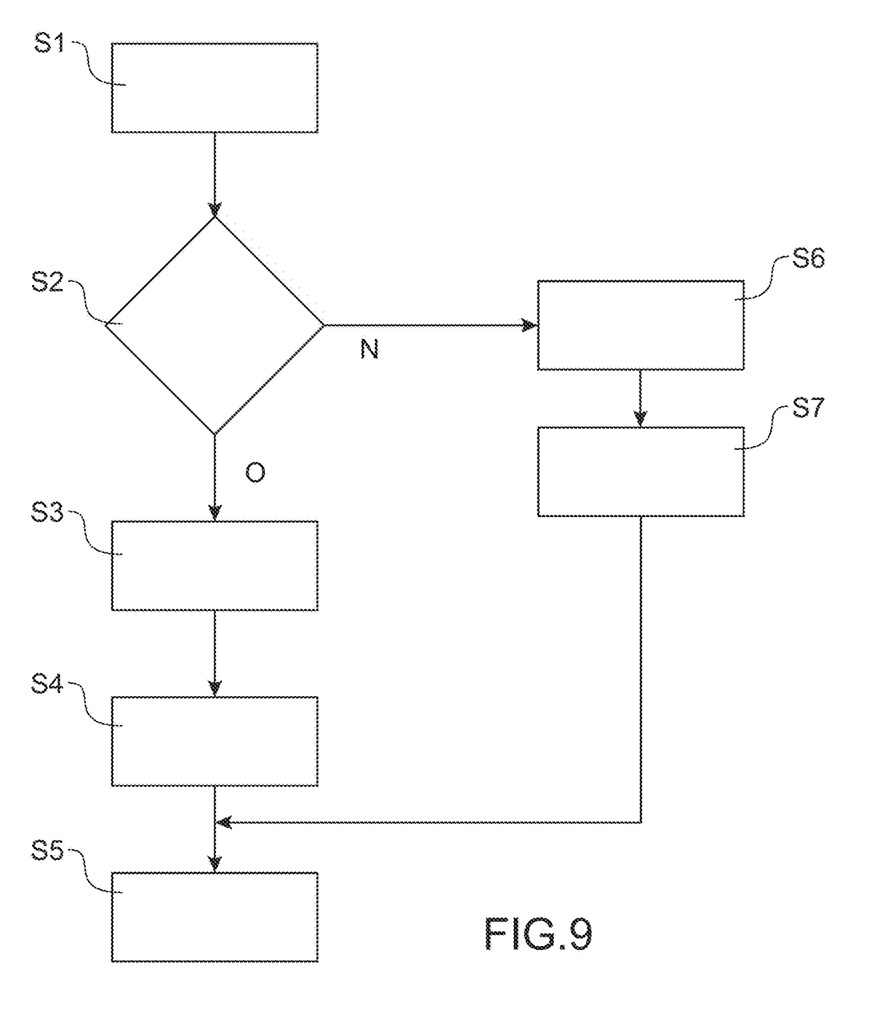
FIG. 9 shows a steps in a method that can be implemented within the scope of the present invention, FIG. 10 schematically shows an assembly comprising an ink circuit, a controller and means forming a user interface.

FIG. 9 shows the steps in a method according to the invention.

In a first step S1, one or more pulses are sent to the electrode by the means 30.

When an event, in the form of a measured signal level $S_m$ which is at least equal to the predetermined threshold $S_p$ is detected by the comparator 36 (step S2), the value of the counter 38 is measured (step S3), and the corresponding level of liquid is calculated (step S4). Step S4 may also comprise a calculation of the mean of several measurements made successively. A new measurement may be made (for example every 100 ms), or the method is terminated (step S5).

If, after step S1, the threshold value is not reached by the capacitance charge signal, for example at the end of a predetermined time interval (step S6), equal to 200 µs according to this example, an excessively full reservoir is deduced from this (step S7), which corresponds to a system fault. The method is terminated (step S5).

A preliminary step may comprise the configuration of a generator 30 to generate pulses which have a predetermined amplitude, It is also possible to have previously configured the counter 38 so that the latter triggers a count starting from the sending of the input signal by the generator 30 (or synchronously with the rising edge of such an input signal), and such that it stops the count when:

the measurement signal reaches the predetermined threshold value (for example 2V), or when a predetermined time interval, greater than the maximum time interval for obtaining a measurement signal for a liquid level in the reservoir which is located in the capacitive behaviour zone, is reached (which corresponds to the case in which the system is considered to have passed to a resistive mode). For example, the time interval for obtaining the amplitude $S_p$ is at most a few tens of µs, for example 100 µs, and the predetermined time interval is of the order of 200 µs: if the measurement signal has not reached the predetermined threshold value $S_p$ when this predetermined time interval has elapsed, it is then considered that the system is in resistive operation, and therefore that the free surface of the liquid reaches at least the maximum level of the dielectric coating 12.

In method or a device according to the invention, filling of the reservoir may be triggered when a low liquid level is detected and/or partial emptying of the reservoir may be triggered when a high liquid level is detected.

A reservoir according to the invention may be linked to a pump or to pumping means 24 (FIG. 4A), themselves linked to a printing head and, where appropriate, to a circuit, or to means which form a circuit, for emptying the reservoir.

An ink circuit of an inkjet may comprise an ink reservoir equipped with means of ink level measurement according to the present invention. An ink circuit example is described in document WO 2011/076810.

It should be recalled that according to one example. the ink circuit may carry out the following functions:
supply ink of suitable quality under pressure to the droplet generator of the head 1,
recover and recycle fluids not used for printing returning from the drain of head 1,
aspiration, for purging the generator, of droplets located in head 1,
supply of solvent to head 1, for rinsing carried out during head maintenance operations.

Figure 10:
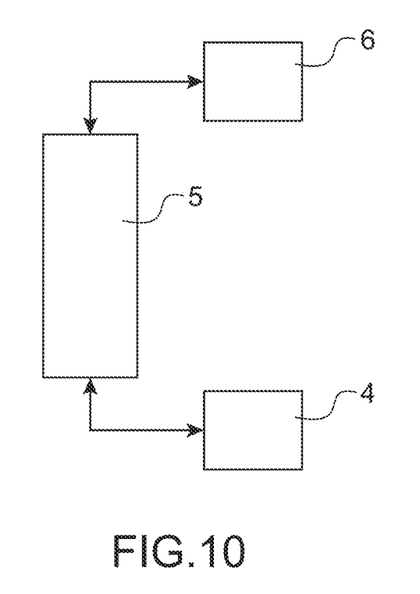

A system comprising an ink circuit 4 with a reservoir equipped with a level measurement device such as described above, and means for storing and for processing the measured data, is illustrated in FIG. 10, which re-uses the numeric references of FIG. 1 for the same technical elements.

The ink circuit 4 sends information, in particular data associated with the height of fluid in a reservoir, measured using a sensor according to the invention, to the means 5 forming a controller. These means may be the same as or may include the means 40 described above. These means 5 are used to control the printer. A user interface 6 may be provided to allow an operator to interact with the printer.

The means 5 may be programmed to:
control the sending of signals by means 30,
receive measurement data (in particular data relating to $t_{sp}$) obtained by the means 36-38 of a sensor according to the invention,
process the measurement data in particular in order to calculate or estimate a height of fluid in the reservoir,
if necessary, to send an instruction to fill the reservoir from, for example, a reserve ink cartridge, depending on the result of the liquid height calculation, if the liquid height is less than a predetermined low threshold; alternatively this may be an instruction to an operator to advise manual filling,
if appropriate, to send an instruction to empty the reservoir, for example using a pump, if the height of the liquid is greater than a predetermined threshold,
if appropriate, to send an alarm signal when a high and/or low threshold is reached in the reservoir.

The printer body or console, 3 (FIG. 1) primarily encloses the ink circuit 4, the controller 5 for operating the printer and a user interface 6 to allow interaction with the printer.

The controller 5 may comprise, for example, a microcomputer or a micro-processor and/or a (or several) electronic boards and/or one (or several) electronic and/or electrical circuits and/or at least one on-board programme, whose configuration or programming ensures control of the ink circuit 4 and of the printer head 1. This controller is used to transmit printing instructions to the head but also to control pumps or valves in the system in order to manage the supply of ink and/or solvent as well as the recovery of the ink and air mixture from the head. It is therefore programmed to this end.

The controller 5 may furthermore comprise means for storing at least one formula and any corresponding parameters, for calculating the height of the fluid. It is therefore configured or programmed to this end.

Instructions, or data, in coded form, for implementing a method according to the invention, in particular as described above, may possibly be created in the form of a computer programme.

The means 5 may comprise means for reading a data medium which comprises data, in coded form, in order to implement a method according to the invention, in particular as described above.

Alternatively, a software product comprises a means of programme data support which can be read by a computer system, which allows a method according to the invention to be implemented, in particular as described above.

Alternatively a data medium which can be read by a computer system, comprises data, in coded form, in order to implement a method according to the invention, in particular as described above.

The invention may be implemented in a continuous inkjet printer (CIJ) as described above in association with FIGS. 1 and 2. This comprises in particular a printing head 1, generally offset relative to the printer body 3, and linked to it by means, for example in the form of a flexible umbilical cable 2 which gathers together hydraulic and electric connections which allow the head to operate. The description of each of the other parts or components disclosed above in connection with FIGS. 1 and 2 is not repeated here but each of said parts or components may be implemented in a printer implementing the invention and may be combined with the invention.

As can be understood from the present description, a device according to the invention uses low cost components 30, 36, 38.

Furthermore, the device according to the invention preferably uses a single electrode, which supplies a measurement signal $S_m$ and/or to which input signals can be applied.

The invention claimed is:

1. Device for level measuring for a reservoir of an inkjet printer, comprising:
   an electrode, which has a first end and a second end, covered, from the first end up to an intermediate level between the first end and the second end, with an electrically insulating coating,
   a circuit for measuring a signal which is characteristic of capacitive behaviour of the electrode and the electrically insulating coating, for a liquid level between said first end and the intermediate level and for identifying resistive behaviour of the electrode, by detecting presence of resistance between the electrode and an earth point, across the liquid, for a level of the liquid above the intermediate level, and
   a circuit for estimating or calculating, from said characteristic signal, a height (h) of the liquid contained in said reservoir, for a liquid level between said first end and the intermediate level,
   wherein the resistive behaviour of the electrode is identified by detecting that the characteristic signal has not reached a predetermined threshold value ($S_p$) or that a predetermined time interval has passed without the characteristic signal reaching the predetermined threshold value ($S_p$).

2. Device according to claim 1, comprising:
   means for applying at least one current pulse to said electrode, with a characteristic signal being emitted by the electrode in response to said at least one current pulse,
   measuring means for measuring the time taken for said characteristic signal to reach the predetermined threshold value ($S_p$), in response to said at least one current pulse.

3. Device according to claim 2, comprising:
   means forming a resistance arranged in series with said electrode,
   means for generating and applying input signals to said resistance,
   said measuring means allowing the time interval for said characteristic signal to reach the predetermined threshold value ($S_p$), in response to an input signal applied to said electrode, to be measured.

4. Device according to claim 3, said input signals being voltage pulses or voltage steps.

5. Device according to claim 2, said measurement means comprising a comparator for comparing an amplitude of said characteristic signal with the predetermined threshold value ($S_p$).

6. Device according to claim 2, furthermore comprising means for detecting a time interval which has elapsed between a synchronous instant of a current pulse applied to said electrode and an instant at which said predetermined threshold value ($S_p$) is reached.

7. Device according to claim 6, where said means for detecting a time interval which has elapsed between the synchronous instant of the current pulse applied to said electrode and the instant at which the predetermined threshold value ($S_p$) is reached, emit a stop signal for the current pulse.

8. Device according to claim 1, comprising:
   at least a generator for applying at least one current pulse to said electrode, with a characteristic signal being emitted by the electrode in response to said at least one current pulse,
   at least a counter or a timer or a clock measuring the time taken for said characteristic signal to reach a predetermined threshold value ($S_p$), in response to said at least one current pulse.

9. Device according to claim 8, comprising:
   a resistance arranged in series with said electrode,
   said generator applying input signals to said resistance,
   said counter or timer or clock allowing the time interval for said characteristic signal to reach the predetermined threshold value ($S_p$), in response to an input signal applied to said electrode, to be measured.

10. Device according to claim 8, further comprising a comparator for comparing an amplitude of said characteristic signal with the predetermined threshold value ($S_p$).

11. Device according to claim 8, said counter or timer or clock detecting a time interval which has elapsed between a synchronous instant of a current pulse applied to said electrode and an instant at which said predetermined threshold value is reached.

12. Device according to claim 11, where said counter or timer or clock emitting a stop signal for the current pulse.

13. Device according to claim 1 wherein the signal which is characteristic of capacitive behaviour of the electrode is representative of a charge of a capacitance formed by a portion of the electrode located between the first end and the intermediate level, the electrically insulating coating and a liquid, when the liquid is contained in the reservoir.

14. Reservoir for ink and/or solvent, for a continuous inkjet printer (CIJ), comprising a level measurement device according to claim 1.

15. Reservoir according to claim 14 comprising a wall at least in part made of metallic material, which is intended to be in contact with a liquid contained in the reservoir.

16. Reservoir according to claim 15, furthermore comprising at least one contact fixed against or inserted in said part made of metallic material.

17. Continuous inkjet printer, comprising:
   an ink circuit and a solvent circuit, at least one of them comprising a reservoir according to claim 14, a printing head, a hydraulic connection to bring ink to be printed from the ink circuit to the printing head and to send ink to be recovered from the printing head to the ink circuit, and an electrical connection to provide an electrical supply to said printing head.

18. Method for measuring a level of ink and/or solvent in a reservoir of a continuous inkjet printer, which implements a device according to claim 1.

19. Device according to claim 1, wherein the resistive behaviour of the electrode is identified by detecting a changed shape of the characteristic signal.

20. Device for level measuring for a reservoir of an inkjet printer, comprising:

an electrode, which has a first end and a second end, covered, from the first end up to an intermediate level between the first end and the second end, with an electrically insulating coating, means for measuring a signal which is characteristic of capacitive behaviour of the electrode and the electrically insulating coating, for a liquid level between said first end and the intermediate level and for identifying resistive behaviour of the electrode, by detecting presence of resistance between the electrode and an earth point, across the liquid, for a level of the liquid above the intermediate level, and means for estimating or calculating, from said characteristic signal, a height of the liquid contained in said reservoir, for a liquid level between said first end and the intermediate level, wherein the resistive behaviour of the electrode is identified by detecting that the characteristic signal has not reached a predetermined threshold value ($S_p$) or that a predetermined time interval has passed without the characteristic signal reaching the predetermined threshold value ($S_p$).

21. Method for measuring a level of ink and/or solvent in a reservoir of a continuous inkjet printer (CIJ), which comprises:

sending at least one current pulse to an electrode, which has a first end and an second end and which is covered from the first end up to an intermediate level between the first end and the second end with an electrically insulating coating, where the electrode and the electrically insulating coating has a capacitive behaviour for a level of liquid between said first end and the intermediate level, and the electrode has a resistive behaviour beyond the intermediate level, the measurement, in response to at least one current pulse sent to the electrode, of a signal characteristic of capacitive behaviour of the electrode and the electrically insulating coating, for a liquid level between said first end and the intermediate level and identification of resistive behaviour of the electrode, by detecting presence of resistance between the electrode and an earth point, across the liquid, for a liquid level greater than the intermediate level, and the estimation or calculation, from said characteristic signal, of a height of the liquid contained in said reservoir, for a liquid level between said first end and the intermediate level, wherein the resistive behaviour of the electrode is identified by detecting that the characteristic signal has not reached a predetermined threshold value ($S_p$) or that a predetermined time interval has passed without the characteristic signal reaching the predetermined threshold value ($S_p$).

* * * * *